E. H. ASHCROFT.
Carbureter.
No. 1,024.
Reissued Aug. 14, 1860.
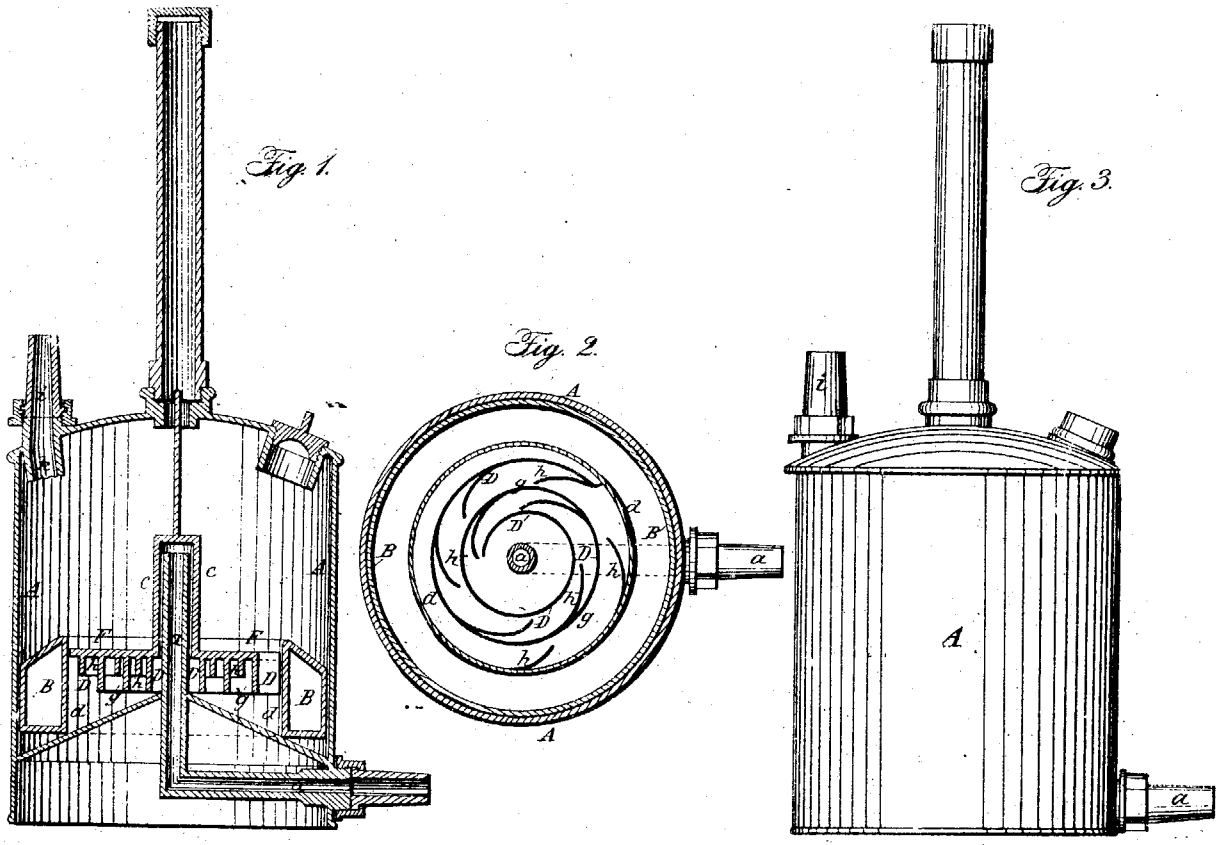

UNITED STATES PATENT OFFICE.

EDWARD H. ASHCROFT, OF BOSTON, MASSACHUSETTS.

IMPROVEMENT IN APPARATUS FOR NAPHTHALIZING GASES.

Specification forming part of Letters Patent No. 28,549, dated June 5, 1860; Reissue No. 1,024, dated August 14, 1860.

*To all whom it may concern:*

Be it known that I, EDWARD H. ASHCROFT, of Boston, in the county of Suffolk and State of Massachusetts, have invented an Improved Apparatus for Naphthalizing Illuminating-Gas; and I do hereby declare that the same is fully described and represented in the following specification and the accompanying drawings, of which—

Figure 1 is a longitudinal section, and Fig. 2 a transverse section, of such apparatus. Fig. 3 is an external elevation of it.

On March 6, 1855, Letters Patent No. 12,498 were granted for an apparatus for purifying illuminating-gas. My improvements have reference to this invention, the patent on which is now held by me, in part, by assignment.

My improved apparatus, although designed for impregnating gas with the vapors of naphtha or any other liquid, is capable of being employed for nearly all, if not all, the purposes for which the said patented apparatus was designed and can be used.

In the drawings, A exhibits the cistern or outer case or vessel for containing the naphthalizing-fluid, and a rotary float, B, a disk, F, and a scroll or spiral passage, D. In this respect the apparatus does not differ from that described in such Patent No. 12,498. The said cistern, when the apparatus is in use, receives its gas by an induction-pipe, *a*, which passes through the scroll D and enters a surrounding tube, *c*, that projects above the disk F of the said scroll, as shown in Fig. 1. This tube *c* extends above the top of the tube *a*, and is closed at its upper, while at its lower end it opens directly into the middle of the scroll D. The scroll-passage, at its external terminus, opens through the disk and directly into the cistern A. The said disk and the scroll are surrounded by the float B, which should be constructed in the form of a hollow annulus, having its inner sides or surface, *d d*, cylindrical and of a diameter to correspond with the external diameter of the disk F, the two being so made that the disk, with its scroll, may be moved vertically within the float and hold to its inner surface by friction. The object of this mode of arranging and applying the float, scroll, and disk is to enable the disk and scroll to be properly adjusted with reference to the plane of flotation of the float, and so that while the float may support the disk and scroll, the lower edge of the boundary-plate *g*, by which the scroll-passage is made, may dip into the liquid within which the float may be merged. After the proper positions of the float, the scroll, and the disk may have been attained, the circumference of the disk may be soldered or otherwise fastened to the float.

Great difficulty is often experienced in adapting a wooden dished float (such as is described in the said Patent No. 12,498) to the disk and scroll so as to properly buoy them within the liquid of the cistern. It is to avoid this difficulty that I have made the improved arrangement and application of the float, scroll, and disk, as described. Furthermore, in order to facilitate the rotation of the float and the scroll, so that they may perform to good advantage the duty of agitating the liquid that may be within the cistern, I combine with the scroll and arrange within it, as shown in Fig. 2, one or more wings, *h h h*. The gas, in its course through the scroll, will strike against the said wing or wings, and afterward be deflected from them and be caused to pass by their outer ends, each wing extending but partially across the scroll-passage. The impingement of the gas against the wings will operate to effect or facilitate the rotary movement of the float and the scroll.

The eduction-pipe of the cistern is shown at *i* as projected down a short distance into the cistern and furnished with a foraminous diaphram, *k*, extended across its mouth. Instead of so combining with the cistern and its exit-pipe a foraminous diaphragm, it may extend across the cistern, the object being to cause the naphthalized gas which may escape from the vessel to pass through such diaphragm before entering the pipes for conducting it to the burner or burners. In practice it is found that by the employment of such a diaphragm a great saving of the naphtha is effected. While the gas retains a sufficiency of the naphtha-vapor for the purposes of combustion, there is little or no condensation of naphtha in the conduit-pipes, and thus the naphtha which would so condense in the pipes is retained by the foraminous diaphragm until the said naphtha is properly vaporized.

In the operation of the apparatus the gas passes through the pipe *o*; thence into and down the pipe *c*; thence into and through the scroll-passage; thence into the cistern or space over the surface of the liquid or naphtha; thence through the foraminous diaphragm and into the eduction pipe, the rotation of the float and scroll being produced in the machine by such gas.

In the above-described apparatus, I claim—

1. The above-specified arrangement and application of the float, scroll, and disk, whereby they are rendered capable of easy and proper adjustment, as explained.

2. The combination of one or more propelling wings, or the equivalent thereof, with the scroll and float, when applied and used within a cistern substantially in manner and for the purpose as described, such propelling devices being to facilitate or effect the rotation of the said float and scroll while buoyed within the liquid, as described.

3. The application and arrangement of the foraminous diaphragm with respect to the cistern and eduction-pipe of the apparatus as described.

E. H. ASHCROFT.

Witnesses:
R. H. EDDY,
F. P. HALE, Jr.